US012205777B2

(12) United States Patent
Liu

(10) Patent No.: US 12,205,777 B2
(45) Date of Patent: Jan. 21, 2025

(54) SWITCH ASSEMBLY AND ELECTRIC DRILL

(71) Applicant: Globe (Jiangsu) Co., Ltd., Changzhou (CN)

(72) Inventor: Shaoqing Liu, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 493 days.

(21) Appl. No.: 17/553,844

(22) Filed: Dec. 17, 2021

(65) Prior Publication Data

US 2022/0199335 A1 Jun. 23, 2022

(30) Foreign Application Priority Data

Dec. 22, 2020 (CN) ......................... 202023111426.4

(51) Int. Cl.

*H01H 13/08* (2006.01)
*B25F 5/02* (2006.01)
*H01H 9/20* (2006.01)
*H01H 13/12* (2006.01)

(52) U.S. Cl.

CPC ............... *H01H 13/08* (2013.01); *B25F 5/02* (2013.01); *H01H 9/20* (2013.01); *H01H 13/12* (2013.01)

(58) Field of Classification Search

CPC .......... H01H 13/08; H01H 9/20; H01H 13/12; H01H 2009/068; H01H 9/06; H01H 3/20; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; B25F 5/02; E21B 11/005

See application file for complete search history.

(56) References Cited

U.S. PATENT DOCUMENTS

| | | | | |
|---|---|---|---|---|
| 5,577,600 | A | 11/1996 | Schoene et al. | |
| 2004/0112731 | A1* | 6/2004 | Shimizu ............... | H01H 23/164 200/339 |
| 2010/0175972 | A1* | 7/2010 | Kimata .................. | H01H 9/282 200/318.1 |
| 2013/0161161 | A1 | 6/2013 | Parrinello | |
| 2014/0174824 | A1* | 6/2014 | Schamberger ......... | H02K 7/145 175/18 |

FOREIGN PATENT DOCUMENTS

| | | |
|---|---|---|
| WO | 03/061913 A1 | 7/2003 |

* cited by examiner

*Primary Examiner* — Ahmed M Saeed

(57) ABSTRACT

The disclosure provides a switch assembly and an electric drill. The switch assembly includes a first switch, a button, and a locking mechanism. The button is provided with a pressing part that cooperates with the first switch, so as to trigger the first switch when the button is pressed. The locking mechanism includes a locking member for locking the button and a trigger pivotally mounted and matched with the locking member. When the locking mechanism is locked, the locking member resists the button, so that the button cannot be pressed. When the trigger is rotated, the trigger drives the locking member to move, so that the locking member is misaligned with the button, and the button can be pressed at this time.

18 Claims, 9 Drawing Sheets

SWITCH ASSEMBLY AND ELECTRIC DRILL

CROSS REFERENCE TO RELATED APPLICATION

The present application is based on, and claims the priority from, Chinese application number CN202023111426.4, filed on Dec. 22, 2020, the disclosure of which is hereby incorporated by reference herein in its entirety for all purposes.

TECHNICAL FIELD

The disclosure relates to a switch assembly and an electric drill with the switch assembly.

BACKGROUND

Because the motor of ice drill or earth drill is heavier and the drill bit is longer, when using ice drill or earth drill, users need to hold the handle with both hands to avoid skew of ice drill or earth drill due to insufficient strength of one hand, which affects the quality of the drilling, or, due to insufficient one-handed power, the ice drill or the earth drill is drilled to the bottom, which will cause a safety accident. In order to prevent the user from accidentally triggering the ice drill or the electric drill, the ice drill or the earth drill is usually provided with a locking mechanism to lock the power switch. Only after unlocking, the user can press the power switch. Such a setting can effectively avoid safety accidents caused by users' accidentally touching the power switch. However, the conventional power switch and locking mechanism require two hands to operate, which reduces the user's control experience.

In view of the above problems, it is necessary to provide a new switch assembly to solve the above problems.

SUMMARY

The disclosure provides a switch assembly that is convenient for users to unlock and press the switch with one hand, which allows user's the other hand for other operations, thereby effectively improves the manipulation experience.

The disclosure provides a switch assembly and an electric drill. The switch assembly includes a first switch, a button, and a locking mechanism. The button is provided with a pressing part that cooperates with the first switch, so as to trigger the first switch when the button is pressed; the locking mechanism includes a locking member for locking the button and a trigger pivotally mounted and matched with the locking member. When the locking mechanism is locked, the locking member resists the button, so that the button cannot be pressed. When the trigger is rotated, the trigger drives the locking member to move, so that the locking member is misaligned with the button, and the button can be pressed at this time.

As a further improvement of the disclosure, the button is provided with an accommodating groove and a first resisting part located in the accommodating groove, the locking member is provided with a second resisting part that cooperates with the first resisting part, when the locking mechanism is locked, the first resisting part resists the second resisting part, and the button cannot be pressed at this time, when the locking mechanism is unlocked, the first resisting part and the second resisting part are misaligned, at this time, when the button is pressed, the second resisting part enters the accommodating groove.

As a further improvement of the disclosure, the button is provided with a first elastic component to reset the button.

As a further improvement of the disclosure, the number of the first resisting part is not less than 3, and the first resisting parts are distributed around the first elastic component.

As a further improvement of the disclosure, the locking member is provided with a first resisting arm, the trigger is provided with a second resisting arm that cooperates with the first resisting arm, when the trigger is rotated, the second resisting arm resists the first resisting arm to drive the locking member to move.

As a further improvement of the disclosure, the first resisting arm is provided with an arc-shaped guide surface that matches with the second resisting arm.

As a further improvement of the disclosure, the switch assembly is further provided with a switch box housing the locking mechanism, the switch box is provided with a first guide rail, and the locking member is provided with a second guide rail matched with the first guide rail to guide the locking member to slide along the first guide rail.

As a further improvement of the disclosure, the first guide rail is a guide groove, and the second guide rail is a guide block matched with the guide groove.

As a further improvement of the disclosure, the locking member is further provided with a second elastic component to reset the locking member.

The disclosure also provides an electric drill. The electric drill includes a support frame, a motor, a drill, and the switch assembly. The support frame is provided with a mounting part and a handle, the motor is fixedly mounted on the mounting part, the drill is fixedly mounted on an output shaft of the motor, and the switch assembly is fixedly installed on the handle and used to control the power-on or power-off of the motor.

As a further improvement of the disclosure, the handle is provided with a receiving groove and an opening communicated with the receiving groove, a part of the trigger is pivotally arranged in the receiving groove through a first pivot, and a part of the trigger passes through the opening and is arranged outside the receiving groove.

As a further improvement of the disclosure, the trigger is provided with a limiting member matched with the receiving groove to limit an initial position of the trigger.

As a further improvement of the disclosure, the electric drill further includes a second switch for controlling the forward or reverse rotation of the motor, the handle includes a first handle and a second handle arranged opposite to the first handle, the switch assembly is fixedly installed on the first handle, and the second switch is fixedly installed on the second handle.

The beneficial effect of the disclosure is that the switch assembly of the disclosure is convenient for the user to unlock and press the switch with one hand, which allows user's the other hand for other operations, thereby effectively improves the manipulation experience.

DETAILED DESCRIPTION

In order to make the purpose, technical solutions and advantages of the disclosure clearer, the disclosure will be described in detail below with reference to the accompanying drawings and specific embodiments.

Figure 1:
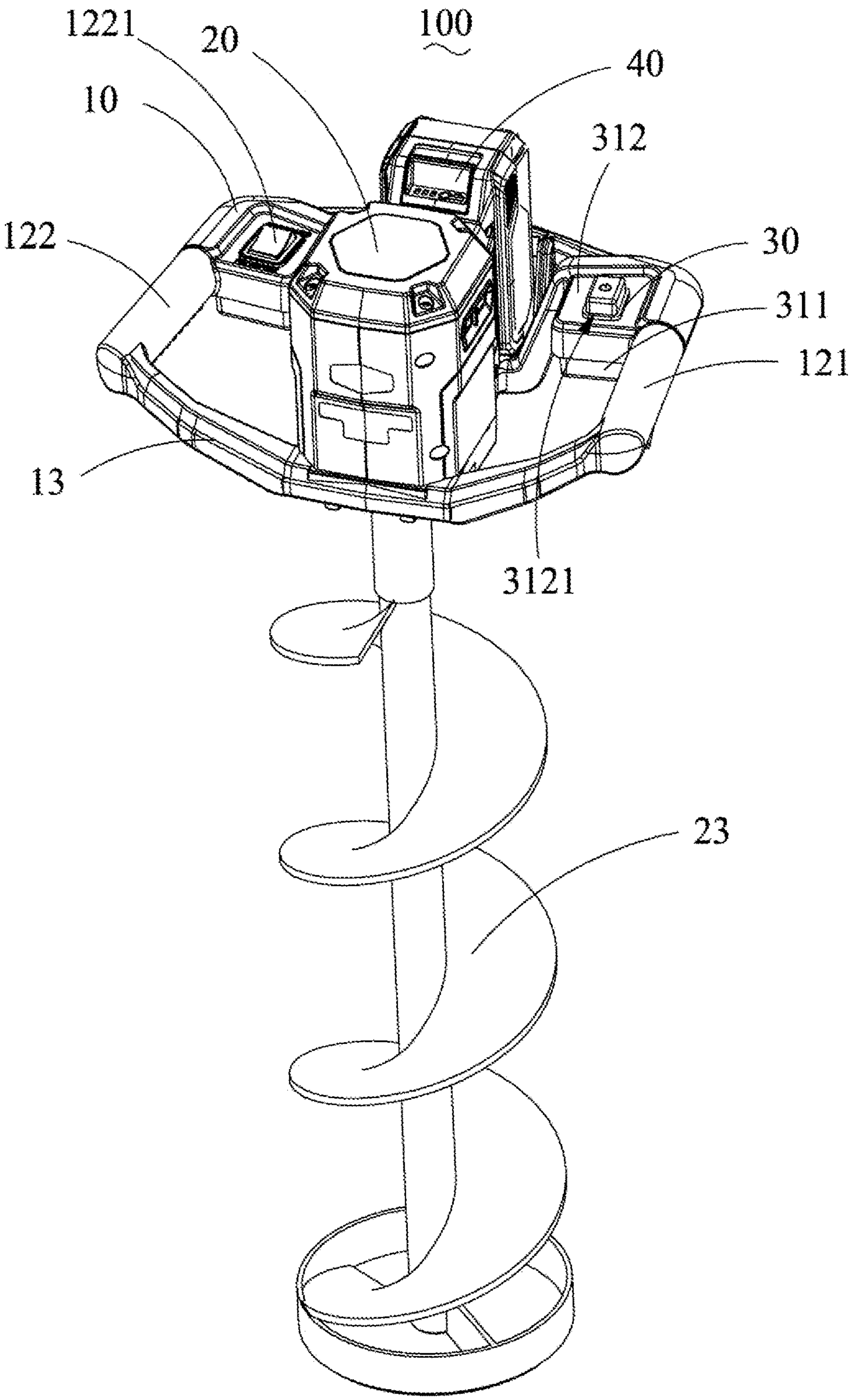
FIG. 1 is a perspective schematic view of an electric drill of the disclosure
Figure 2:
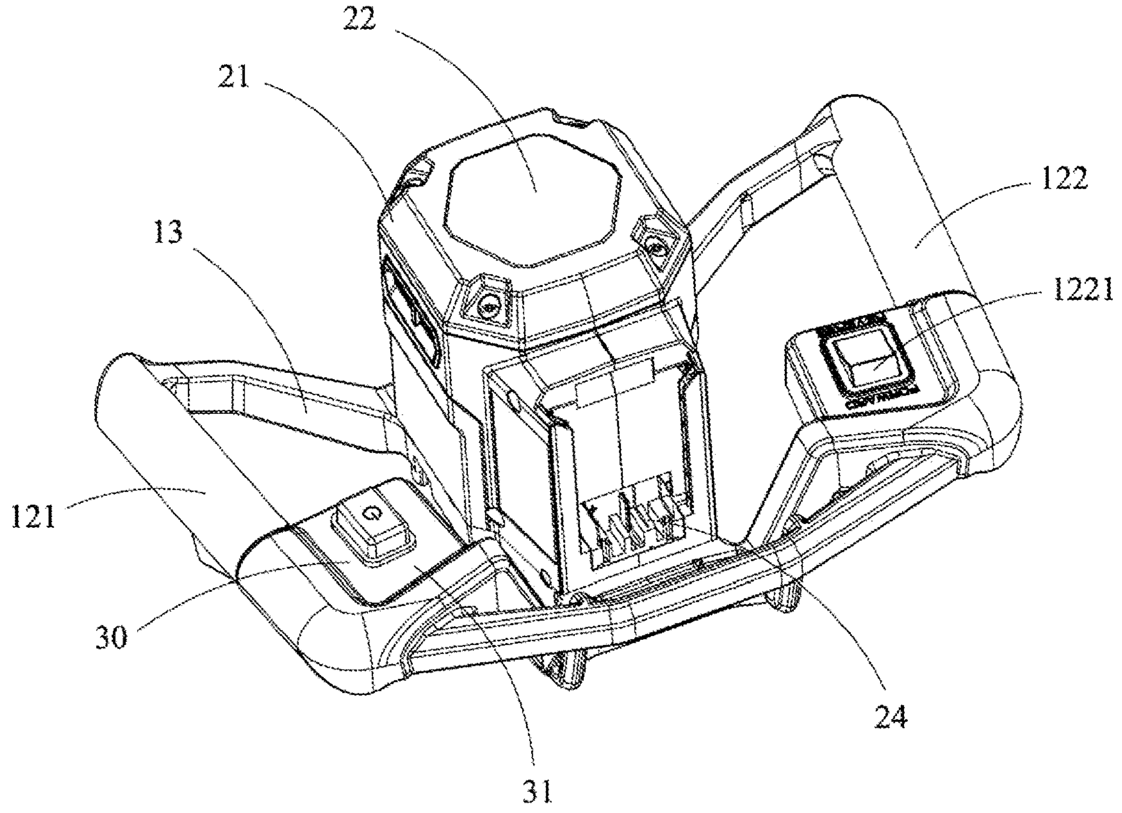
FIG. 2 is a perspective schematic view of the electric drill shown in FIG. 1 with the drill bit removed.
Figure 3:
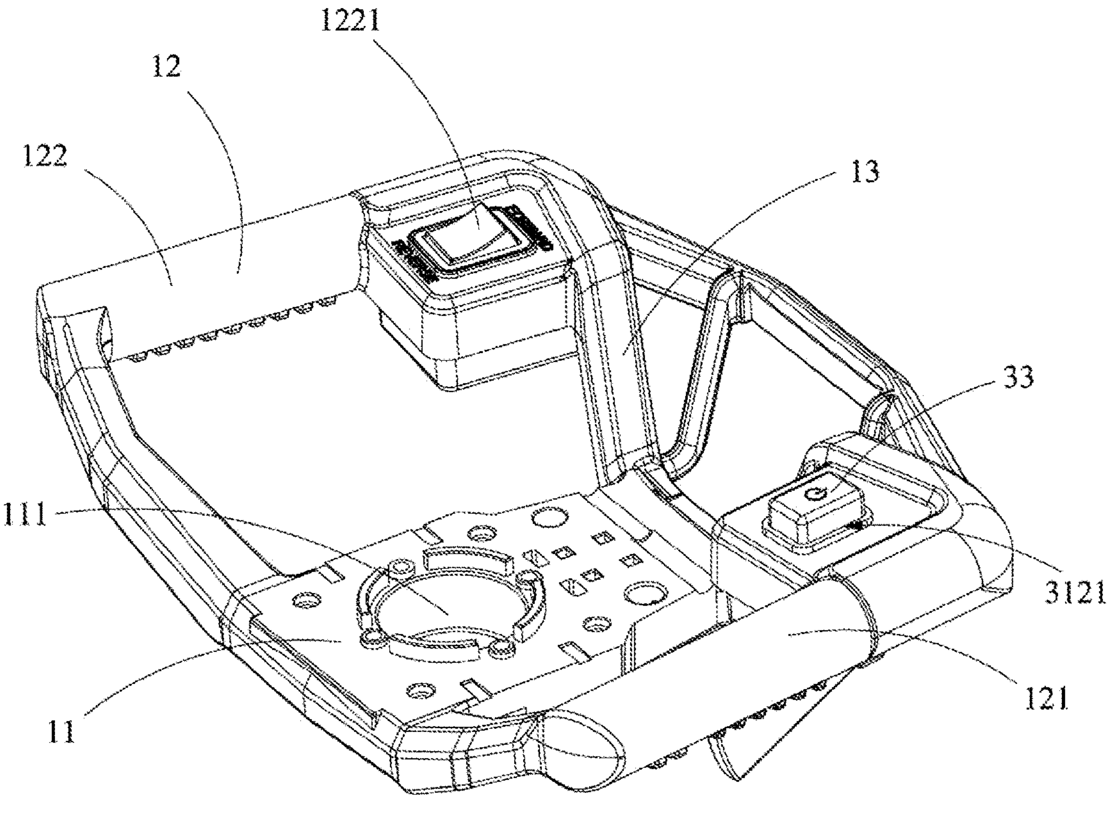
FIG. 3 is a perspective schematic view of a support frame.
Figure 4:
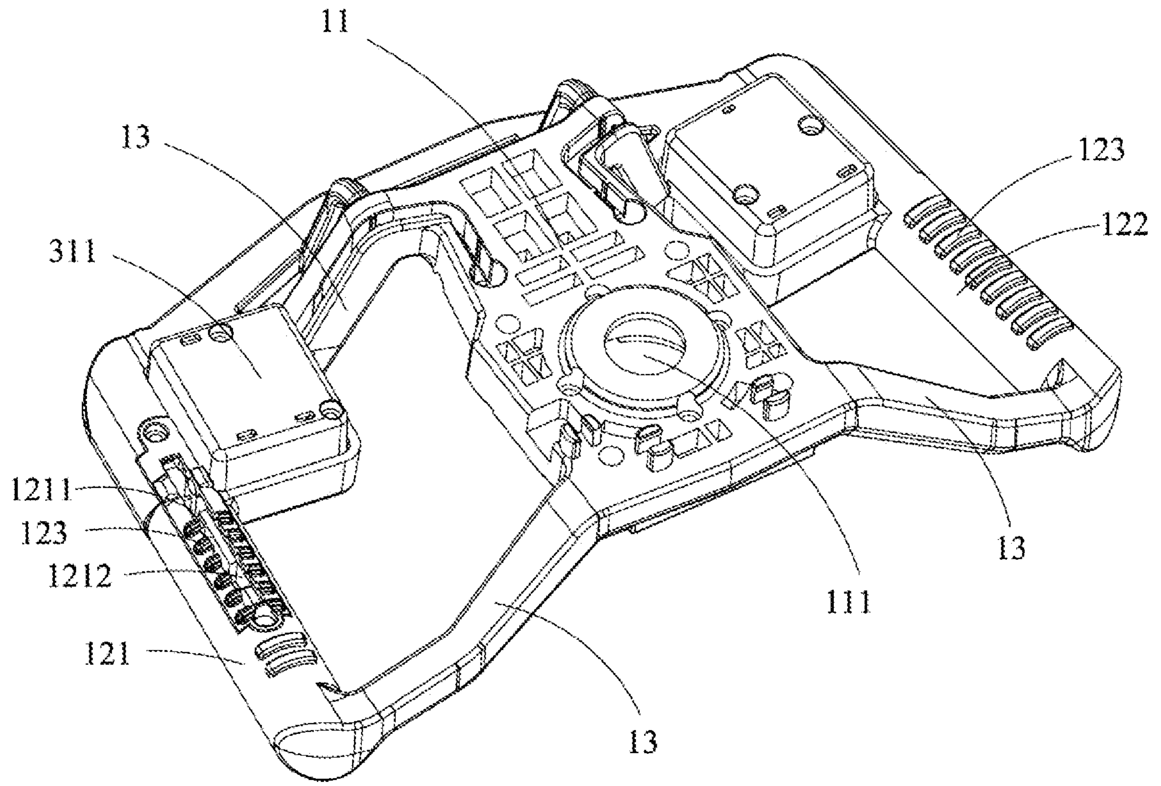
FIG. 4 is a perspective schematic view of the support frame shown in FIG. 3 from another angle.

Please refer to FIG. 1 and FIG. 2. The disclosure provides an electric drill 100 for drilling on the ground, ice and the like. The electric drill 100 includes a support frame 10, an operating mechanism 20 installed on the support frame 10, a switch assembly 30 for controlling the operation of the operating mechanism 20, and a battery pack 40 for supplying power to the operating mechanism 20.

Please refer to FIG. 3, FIG. 4, and FIG. 1, FIG. 2, the support frame 10 includes a mounting part 11, a handle 12 located on the periphery of the mounting part 11 and a connecting part 13. The mounting part 11 is in the shape of a flat plate, and the operating mechanism 20 is fixedly mounted on the mounting part 11. The mounting part 11 is provided with a through hole 111 that cooperates with the operating mechanism 20. The handle 12 is located at the periphery of the mounting part 11 and includes a first handle 121 and a second handle 122 set opposite to the first handle 121. A receiving groove 1211 that matches with the switch assembly 30 is arranged inside the first handle 121. A side of the first handle 121 facing the ground is provided with an opening 1212 communicated with the receiving groove 1211, so that the receiving groove 1211 is communicated with the outside. The second handle 122 is provided with a second switch 1221, and the second switch 1221 is used to control the forward or reverse rotation of the operating mechanism 20. Preferably, the second switch 1221 is arranged at an end of the second handle 122 away from the user. Preferably, the sides of the first handle 121 and the second handle 122 facing the ground are provided with anti-slip patterns 123. This arrangement can effectively increase the friction between the palm and the first handle 121 and the second handle 122, thereby effectively preventing the electric drill 100 from getting out of hand.

Please refer to FIG. 1 and FIG. 2, the operating mechanism 20 includes a housing 21, a motor 22 housed in the housing 21, a drill bit 23 mounted on the motor 22 and a docking interface 24 mounted on the housing 21. The housing 21 is fixedly mounted on the mounting part 11. The motor 22 is housed in the housing 21 and is provided with an output shaft (not shown). The output shaft of the motor 22 passes through the through hole 111, and the drill bit 23 is fixedly mounted on the output shaft, so that the motor 22 can drive the drill bit 23 to rotate. The docking interface 24 is fixedly installed on the housing 21 and is located on a side of the housing 21 away from the user. The battery pack 40 is inserted into the docking interface 24 to supply power for the motor 22.

Figure 9:
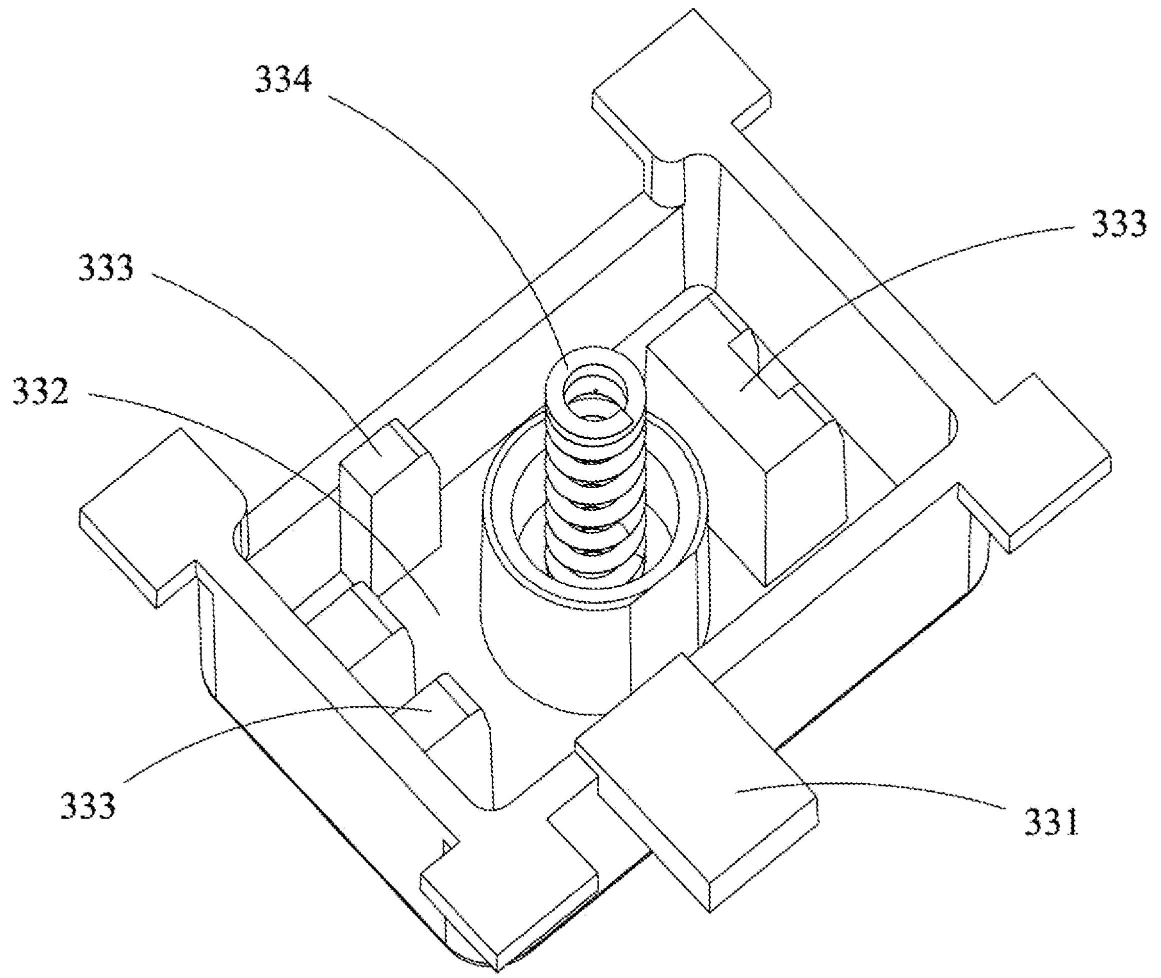
FIG. 9 is a perspective schematic view of the button.

Please refer to FIG. 5, FIG. 7 and FIG. 1 and FIG. 2. The switch assembly 30 is fixedly installed on the first handle 121 and is located at an end of the first handle 121 away from the user. The switch assembly 30 is used to control the on-off between the motor 22 and the battery pack 40. The switch assembly 30 includes a switch box 31, a first switch 32, a button 33 and a locking mechanism 34. The switch box 31 includes a bottom box 311 fixedly mounted on the first handle 121 and a box cover 312 mounted on the bottom box 311. The bottom box 311 and the box cover 312 cooperate to form a receiving space 313 for receiving the first switch 32 and the locking mechanism 34. The box cover 312 is provided with an opening 3121 matched with the button 33. The first switch 32 is used to control the on-off between the motor 22 and the battery pack 40. In this embodiment, the first switch 32 is a micro switch. Please refer to FIG. 3, FIG. 7 and FIG. 9, the button 33 passes through the opening 3121, so that the button 33 is partially located in the receiving space 313 and partially located outside the receiving space 313, which is convenient for users to press. The button 33 includes a pressing part 331, an accommodating groove 332, and a first resisting part 333 located in the accommodating groove 332. The pressing part 331 is formed through protruding outward from the side wall of the button 33 and cooperates with the first switch 32 to trigger the first switch 32 when the button 33 is pressed. The accommodating groove 332 is formed by recessing inward from the side of the button 33 facing the first switch 32. Preferably, the button 33 is further provided with a first elastic component 334. One end of the first elastic component 334 resists the button 33 and the other end resists the bottom box 311. When the button 33 is pressed, the first elastic component 334 is elastically deformed, when the button 33 is released, the button 33 is reset under the action of the first elastic component 334.

Figure 5:
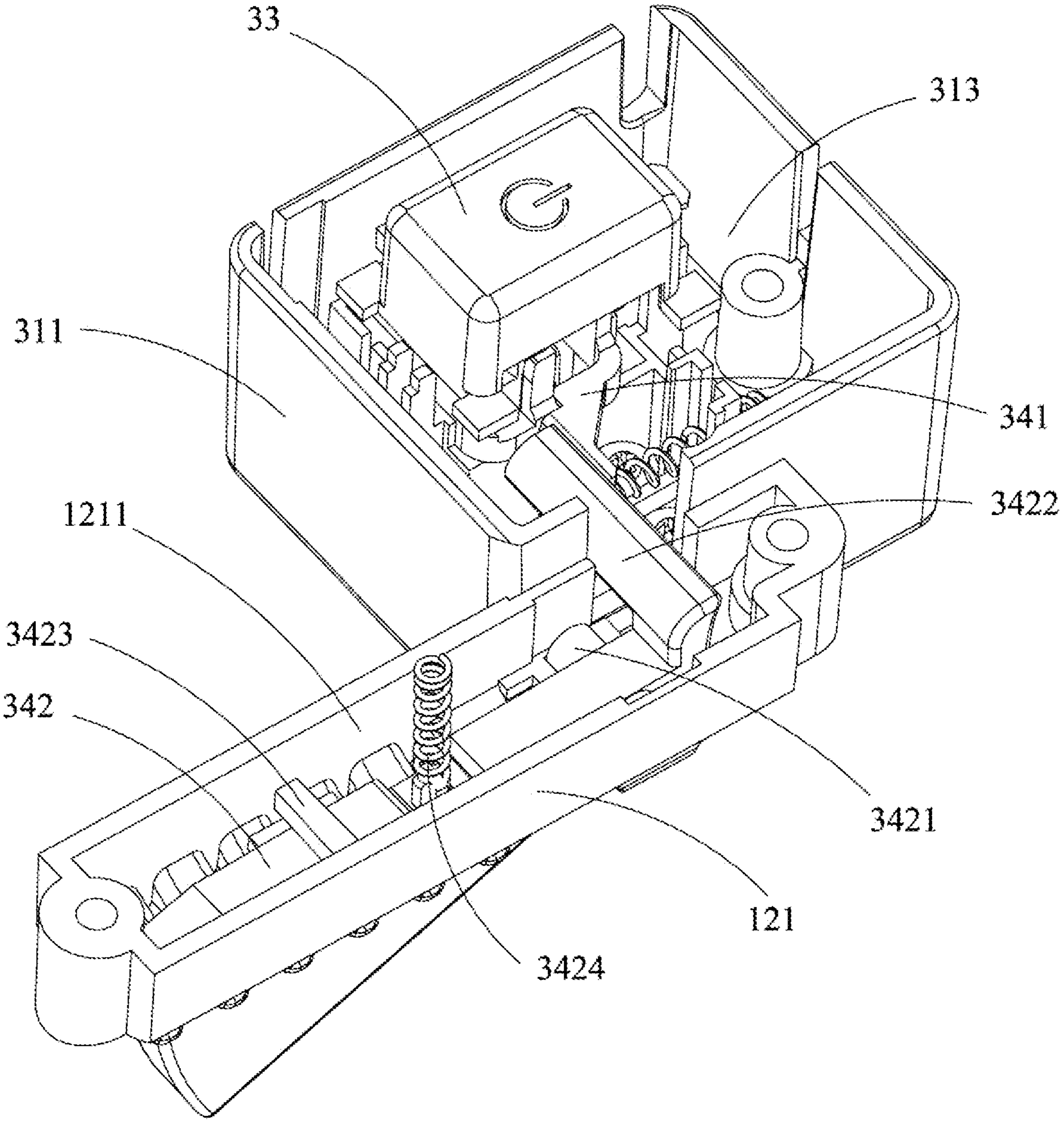
FIG. 5 is a perspective schematic view of a switch assembly.
Figure 6:
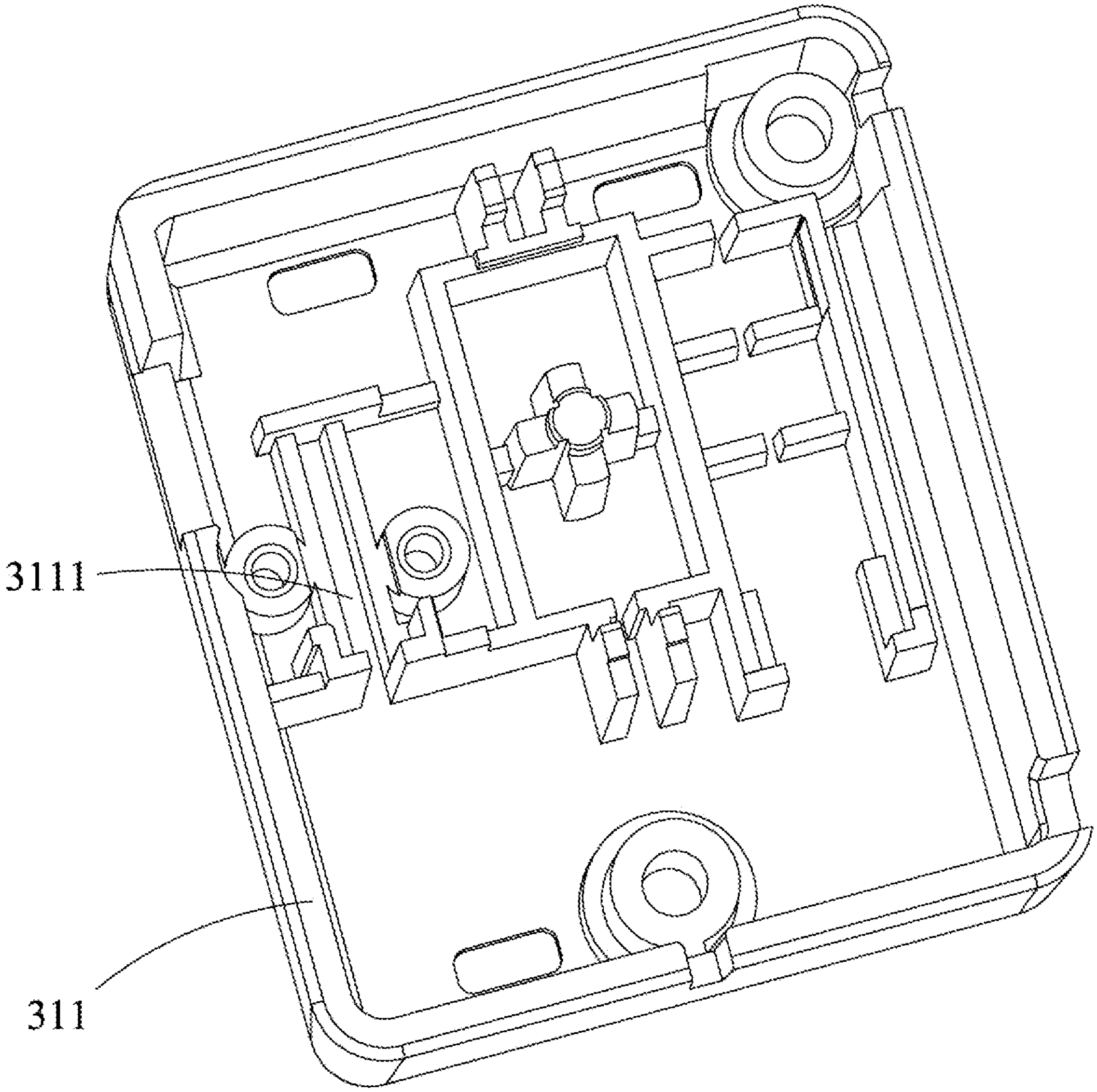
FIG. 6 is a perspective view of a bottom box.
Figure 7:
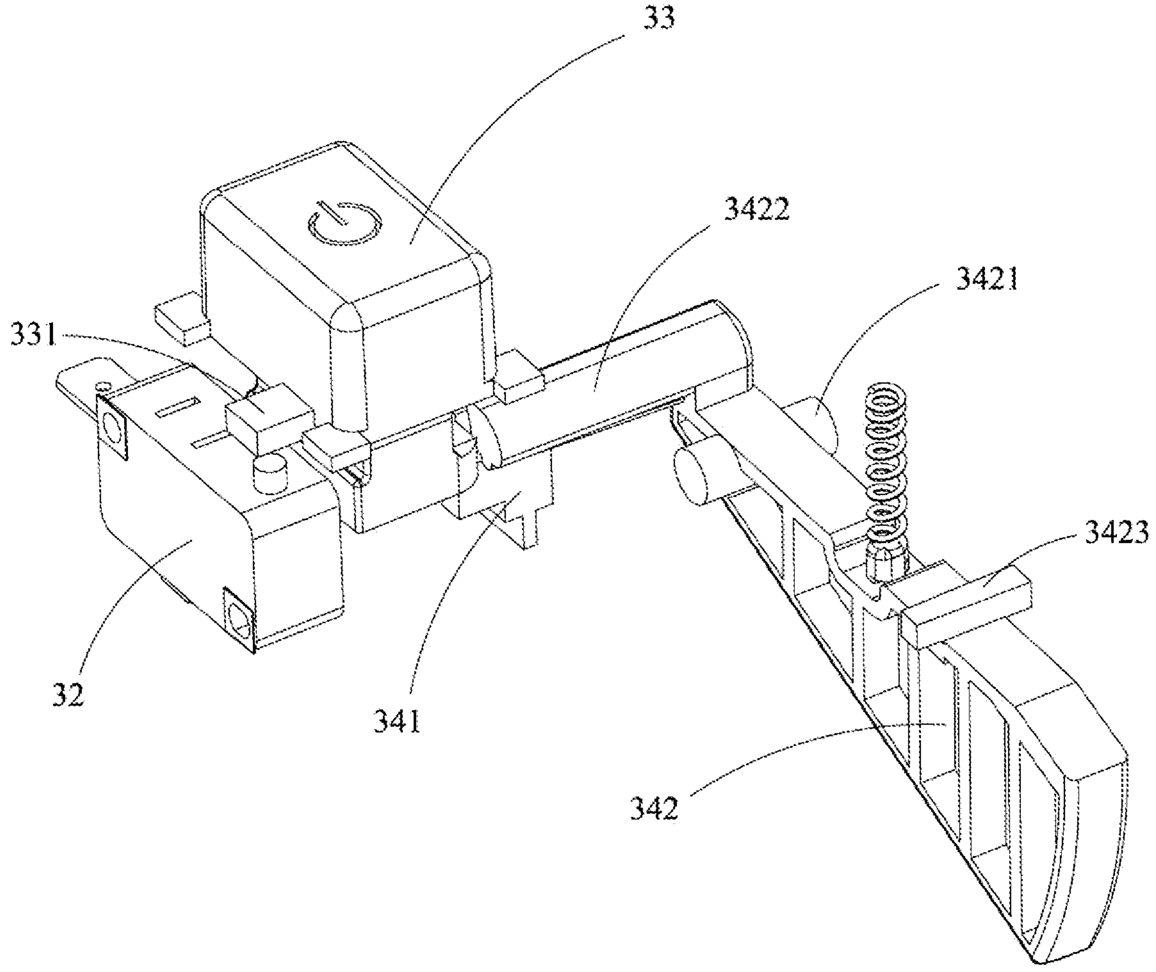
FIG. 7 is a schematic view of a cooperation of a first switch, a button and a locking mechanism.
Figure 8:
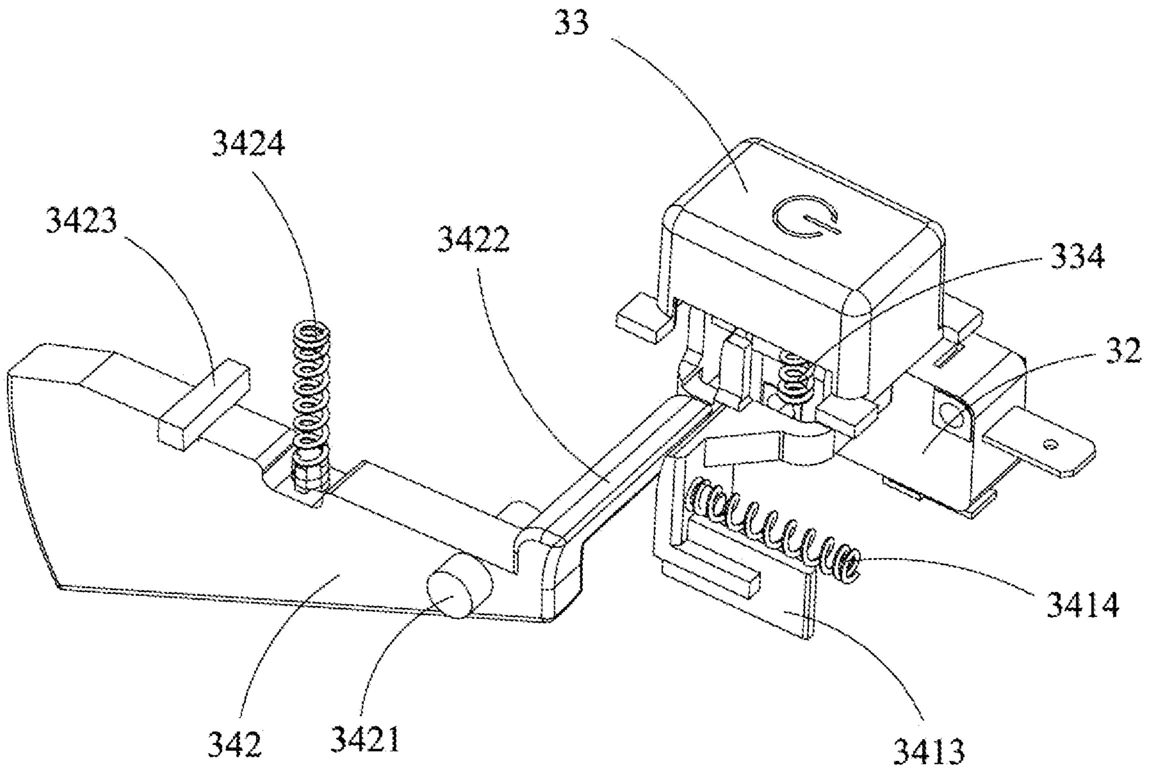
FIG. 8 is a perspective schematic view of the cooperation of the first switch, the button and the locking mechanism from another angle.
Figure 10:
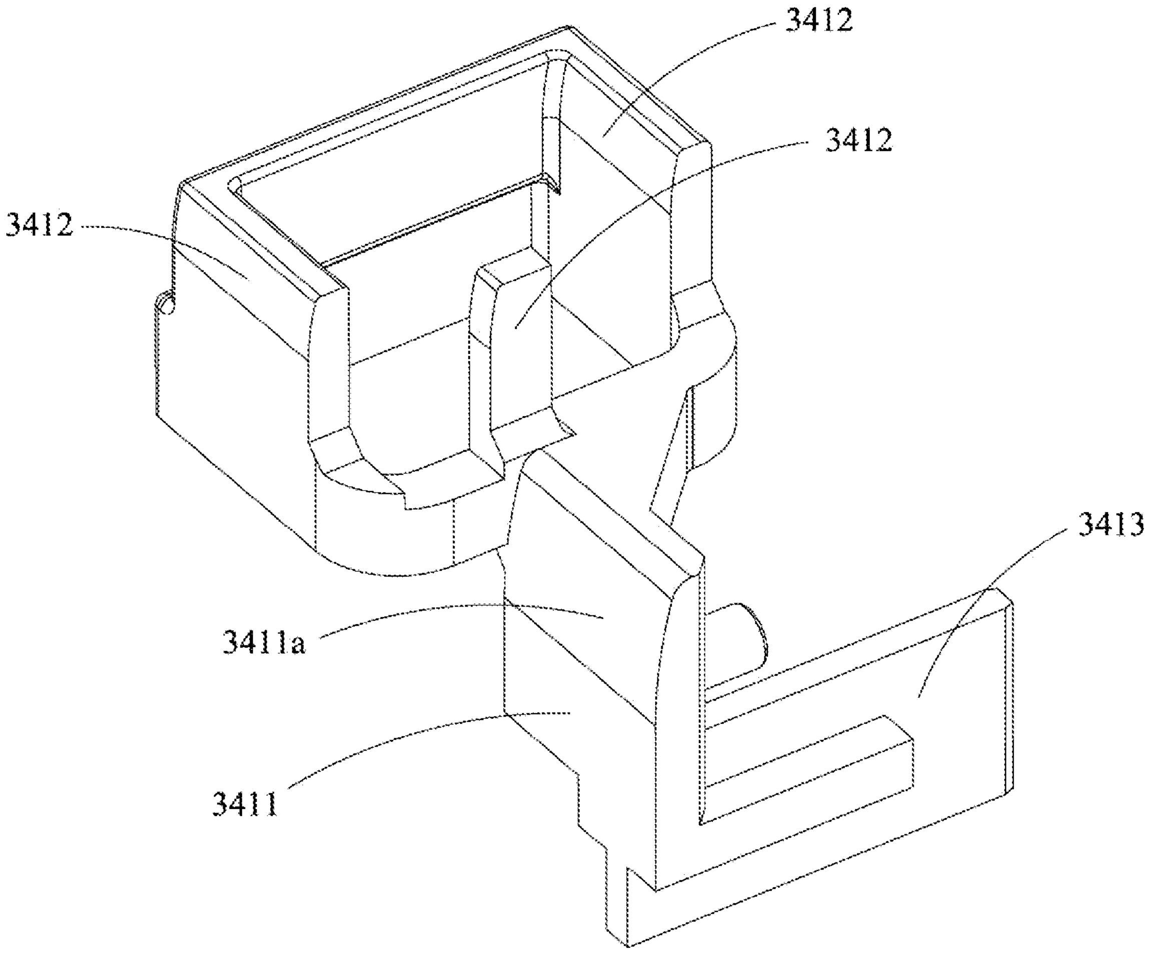
FIG. 10 is a perspective schematic view of a locking member.

Please refer to FIG. 5, FIG. 7 and FIG. 8, the locking mechanism 34 includes a locking member 341 and a trigger 342 pivotally mounted and matched with the locking member 341. The locking member 341 is received in the receiving space 313 for locking the button 33. Please refer to FIG. 10, the locking member 341 includes a first resisting arm 3411, a second resisting part 3412 located on one side of the first resisting arm 3411, and a second guide rail 3413 located on the other side of the first resisting arm 3411. The second resisting part 3412 is used to cooperate with the first resisting part 333. When the locking mechanism 34 is locked, the first resisting part 333 is facing the second resisting part 3412, and the button 33 cannot be pressed at this time. When the locking mechanism 34 is unlocked, the first resisting part 333 and the second resisting part 3412 are misaligned, and the button 33 can be pressed at this time, when the button 33 is pressed, the second resisting part 3412 enters the accommodating groove 332, and the pressing part 331 resists the first switch 32, which triggers the first switch 32. Preferably, the numbers of the first resisting part 333 and the second resisting part 3412 are not less than three, and they are evenly distributed around the first elastic component 334. With this arrangement, when the button 33 is locked and the user presses the button 33, the button 33 will not sway sideways, which prevents the button 33 from erroneously triggering the first switch 32. Please refer to FIG. 6, the bottom box 311 is provided with a first guide rail 3111. The first guide rail 3111 cooperates with the second guide rail 3413 to guide the locking member 341 to move in the receiving space 313. In this embodiment, the first guide rail 3111 is a guide groove, and the second guide rail 3413 is a guide block that cooperates with the guide groove. Of course, it is understandable that in other embodiments, the first guide rail 3111 can also be set as a guide block, and the second guide rail 3413 is set as a guide groove. Preferably, the locking member 341 is further provided with a second elastic component 3414 for resetting the locking member 341. One end of the second elastic component 3414 resists the locking member 341, and the other end resists the bottom box 311.

Please refer to FIG. 5 and FIG. 7, the trigger 342 is pivotally mounted on the first handle 121 through a first pivot 3421. The first pivot 3421 and part of the trigger 342 are located in the receiving groove 1211. Part of the trigger 342 passes through the opening 1212 and is located outside the receiving groove 1211. The trigger 342 is provided with a second resisting arm 3422 that cooperates with the first resisting arm 3411. When the trigger 342 is rotated, the second resisting arm 3422 resists the first resisting arm 3411 to drive the locking member 341 to slide along the first guide rail 3111, so that the first resisting part 333 is misaligned with the second resisting part 3412, at this time, the second elastic component 3414 is elastically deformed under the action of the locking member 341. When the trigger 342 is released, the locking member 341 is reset under the action of the second elastic component 3414. Preferably, the first resisting arm 3411 is further provided with an arc-shaped guide surface 3411*a* that cooperates with the second resisting arm 3422, so that the coordination between the first resisting arm 3411 and the second resisting arm 3422 becomes smooth, which reduces resistance. Preferably, the trigger 342 is further provided with a limiting member 3423 that cooperates with the receiving groove 1211 to limit the initial position of the trigger 342. Preferably, the trigger 342 is further provided with a third elastic component 3424. One end of the third elastic component 3424 resists the trigger 342, and the other end resists the first handle 121. When the trigger 342 is pressed, the third elastic component 3424 is elastically deformed, when the trigger 342 is released, the trigger 342 is reset under the action of the third elastic component 3424.

Compared with the prior art, the switch assembly 30 of the disclosure can facilitate the user to unlock and press the switch with one hand, which allows user's the other hand to perform other operations and effectively improves the user's experience.

The above embodiments are only used to illustrate the technical solution of the disclosure and not to limit it. Although the disclosure is described in detail with reference to the preferred embodiments, those of ordinary skill in the art should understand that the technical solution of the disclosure can be modified or replaced without departing from the spirit and scope of the technical solution of the disclosure.

What is claimed is:

1. A switch assembly, comprising:

a first switch, a button, provided with a pressing part that cooperates with the first switch, so as to trigger the first switch when the button is in a pressed state, and a locking mechanism, comprising a locking member for locking the button and a trigger pivotally mounted and matched with the locking member, wherein when the locking mechanism is in a locked state, the locking member resists the button, so that the button is un-pressable, wherein when the trigger is rotated, the trigger drives the locking member to move, so that the locking member is misaligned with the button, and the button is pressable at this time; and wherein the locking member is provided with a first resisting arm, the trigger is provided with a second resisting arm that cooperates with the first resisting arm, when the trigger is rotated, the second resisting arm resists the first resisting arm to drive the locking member to move.

2. The switch assembly according to claim 1, wherein the button is provided with an accommodating groove and a first resisting part arranged in the accommodating groove, the locking member is provided with a second resisting part that cooperates with the first resisting part; when the locking mechanism is in the locked state, the first resisting part resists the second resisting part, and the button is un-pressable at this time, when the locking mechanism is in an unlocked state, the first resisting part and the second resisting part are misaligned, at this time, when the button is pressed, the second resisting part enters the accommodating groove.

3. The switch assembly according to claim 2, wherein the button is provided with a first elastic component to reset the button.

4. The switch assembly according to claim 3, wherein the number of the first resisting part is not less than 3, and the first resisting parts are distributed around the first elastic component.

5. The switch assembly according to claim 1, wherein the first resisting arm is provided with an arc-shaped guide surface that matches with the second resisting arm.

6. The switch assembly according to claim 1, further comprising a switch box for housing the locking mechanism, wherein the switch box is provided with a first guide rail, and the locking member is provided with a second guide rail matched with the first guide rail to guide the locking member to slide along the first guide rail.

7. The switch assembly according to claim 6, wherein the first guide rail is a guide groove, and the second guide rail is a guide block matched with the guide groove.

8. The switch assembly according to claim 7, wherein the locking member is further provided with a second elastic component to reset the locking member.

9. An electric drill, comprising:

a support frame, provided with a mounting part and a handle;

a motor, fixedly arranged on the mounting part;

a drill, fixedly arranged on an output shaft of the motor; and a switch assembly, comprising:

a first switch, a button, provided with a pressing part that cooperates with the first switch, so as to trigger the first switch when the button is in a pressed state, and a locking mechanism, comprising a locking member for locking the button and a trigger pivotally mounted and matched with the locking member, wherein when the locking mechanism is in a locked state, the locking member resists the button, so that the button is un-pressable, wherein when the trigger is rotated, the trigger drives the locking member to move, so that the locking member is misaligned with the button, and the button is pressable at this time;

wherein the locking member is provided with a first resisting arm, the trigger is provided with a second resisting arm that cooperates with the first resisting arm, when the trigger is rotated, the second resisting arm resists the first resisting arm to drive the locking member to move; and wherein the switch assembly is fixedly arranged on the handle and used to control the power-on or power-off of the motor.

10. The electric drill according to claim 9, wherein the handle is provided with a receiving groove and an opening communicated with the receiving groove, a part of the trigger is pivotally arranged in the receiving groove through a first pivot, and a part of the trigger passes through the opening and is arranged outside the receiving groove.

11. The electric drill according to claim 10, wherein the trigger is provided with a limiting member matched with the receiving groove to limit an initial position of the trigger.

12. The electric drill according to claim 9, further comprising a second switch for controlling the forward or reverse rotation of the motor, wherein the handle includes a first handle and a second handle arranged opposite to the first handle, the switch assembly is fixedly arranged on the first handle, and the second switch is fixedly arranged on the second handle.

13. The electric drill according to claim 9, wherein the button is provided with an accommodating groove and a first resisting part arranged in the accommodating groove, the locking member is provided with a second resisting part that cooperates with the first resisting part; when the locking mechanism is in the locked state, the first resisting part resists the second resisting part, and the button is un-pressable at this time, when the locking mechanism is in an unlocked state, the first resisting part and the second resisting part are misaligned, at this time, when the button is pressed, the second resisting part enters the accommodating groove.

14. The electric drill according to claim 13, wherein the button is provided with a first elastic component to reset the button.

15. The electric drill according to claim 14, wherein the number of the first resisting part is not less than 3, and the first resisting parts are distributed around the first elastic component.

16. The electric drill according to claim 9, wherein the first resisting arm is provided with an arc-shaped guide surface that matches with the second resisting arm.

17. The electric drill according to claim 9, the switch assembly further comprising a switch box for housing the locking mechanism, wherein the switch box is provided with a first guide rail, and the locking member is provided with a second guide rail matched with the first guide rail to guide the locking member to slide along the first guide rail.

18. The switch assembly according to claim 17, wherein the first guide rail is a guide groove, and the second guide rail is a guide block matched with the guide groove.

* * * * *